(12) United States Patent
Katsman

(10) Patent No.: US 9,200,906 B1
(45) Date of Patent: Dec. 1, 2015

(54) SYSTEM AND METHODS FOR HANDHELD DEVICE BASED BATTERY EFFICIENT CONTEXT MONITORING, DETECTION OF A VEHICULAR MOTION AND IDENTIFICATION OF A SPECIFIC VEHICLE

(71) Applicant: Igor Katsman, Haifa (IL)

(72) Inventor: Igor Katsman, Haifa (IL)

(73) Assignee: DRIVEWAY SOFTWARE CORPORATION, San Mateo, CA (US)

( * ) Notice: Subject to any disclaimer, the term of this patent is extended or adjusted under 35 U.S.C. 154(b) by 0 days.

(21) Appl. No.: 14/260,278

(22) Filed: Apr. 23, 2014

Related U.S. Application Data

(60) Provisional application No. 61/815,024, filed on Apr. 23, 2013.

(51) Int. Cl.
*G01C 21/20* (2006.01)
*G01S 19/13* (2010.01)

(52) U.S. Cl.
CPC ............... *G01C 21/20* (2013.01); *G01S 19/13* (2013.01)

(58) Field of Classification Search
CPC ..... G01C 21/20; G01C 21/3484; G01S 19/13
USPC ................................................. 701/490, 444
See application file for complete search history.

(56) References Cited

U.S. PATENT DOCUMENTS

| | | | |
|---|---|---|---|
| 2004/0204840 A1* | 10/2004 | Hashima et al. | 701/209 |
| 2013/0245986 A1* | 9/2013 | Grokop et al. | 702/141 |
| 2014/0187149 A1* | 7/2014 | Lortz et al. | 455/41.1 |

\* cited by examiner

*Primary Examiner* — Mary Cheung
*Assistant Examiner* — Anne Mazzara
(74) *Attorney, Agent, or Firm* — TransPacific Law Group; Pavel I. Pogodin, Esq.

(57) ABSTRACT

A method performed in connection with a handheld communication device for monitoring a context in a battery efficient manner and for detecting a vehicular motion context, the handheld communication device comprising a GPS hardware component, a network-based position estimation component and a data processor, the method comprising: acquiring a sequence of location data readings using the network-based position estimation component; identifying a non-vehicular motion context based on changes in the acquired sequence of the location data readings; if the non-vehicular motion context is identified, continuing to acquire the sequence of the location data readings; if the non-vehicular motion context is not identified, powering on the GPS hardware component and acquiring speed data using the GPS hardware component, determining whether the acquired speed is within predetermined vehicular speed ranges and identifying either a vehicular motion context or the non-vehicular motion context.

14 Claims, 4 Drawing Sheets

SYSTEM AND METHODS FOR HANDHELD DEVICE BASED BATTERY EFFICIENT CONTEXT MONITORING, DETECTION OF A VEHICULAR MOTION AND IDENTIFICATION OF A SPECIFIC VEHICLE

CROSS-REFERENCE TO RELATED PATENT APPLICATION

The present regular U.S. patent application relies upon, claims the benefit of priority from, and is a non-provisional of U.S. provisional patent application No. 61/815,024 filed on Apr. 23, 2013, the entire disclosure of which is incorporated by reference herein. This U.S. patent application is also related to co-pending U.S. patent application entitled "SYSTEMS AND METHODS FOR TRANSFORMING SENSORY MEASUREMENTS OF A HANDHELD DEVICE LOCATED IN MOVING VEHICLE FROM DEVICE'S COORDINATE SYSTEM TO THAT OF A VEHICLE" filed on the same day, the entire disclosure of which is incorporated by reference herein.

BACKGROUND OF THE INVENTION

1. Technical Field

The disclosed embodiments relate in general to vehicle monitoring and more specifically to a device and method for handheld device based battery efficient context monitoring and detection of a vehicular motion (driving trips). Furthermore, the disclosed embodiments relate to the identification of a specific vehicle and, more particularly, to a device and method for handheld device context monitoring and detection of unique vehicular patterns (including, but not limited to, sound patterns and blue tooth patterns).

2. Description of the Related Art

Monitoring context and detecting vehicular motion is an important task that enables automatic assessment of the driving skills. OBD-2 based devices, attached to a car onboard diagnostic port, read speed from OBD-2 port and use it to successfully detect start and end of the time period of vehicular motion, which is also referred to herein as a driving trip.

Many handheld devices (for example smartphones, tablets, etc.) are equipped with built-in GPS hardware component that enables devices to read motion speed on a second by second basis. These speed readings can be used to monitor the context of handheld device and detect start and end of the vehicular motion. (driving trip). Since GPS hardware component needs a lot of power to operate, its frequent utilization required for efficient speed monitoring has a severe impact on the handheld device's battery drainage. Thus, due to battery limitation, this method cannot be practically used to monitor vehicular motion 24×7.

A modern handheld device includes many advanced hardware components. For instance, some smartphones include components with capabilities similar to those of a simple personal computer, e.g., random access memory (RAM), data storage media, CPU, graphics accelerator, and alphanumeric keypad. In addition, a phone may include such components as motion sensors (i.e. accelerometers, etc.), orientation sensors (gyroscopes, magnetometers, etc.), light sensors, pressure sensors, GPS hardware component, network-based position estimation component, one or more video cameras, networking and Internet capability, remote component connectivity, high quality display, touch screen, battery, microphone, speakerphone, Bluetooth, NFC, and other components.

Accordingly, new and improved systems and methods are needed that provide a handheld device based system for battery efficient context monitoring and detection of a vehicular motion. In addition, new and improved systems and methods are needed that provide a handheld device based system for identification of a specific vehicle associated with the detected vehicular motion.

SUMMARY OF THE INVENTION

The embodiments described herein are directed to methods and systems that substantially obviate one or more of the above and other problems associated with conventional systems and methods for vehicle monitoring.

In accordance with one aspect of the embodiments described herein, there is provided a method performed in connection with a handheld communication device for monitoring a context in a battery efficient manner and for detecting a vehicular motion context, the handheld communication device comprising a GPS hardware component, a network-based position estimation component and a data processor, the method comprising: acquiring a sequence of location data readings using the network-based position estimation component; identifying a non-vehicular motion context based on changes in the acquired sequence of the location data readings; if the non-vehicular motion context is identified, continuing to acquire the sequence of the location data readings; if the non-vehicular motion context is not identified, powering on the GPS hardware component and acquiring speed data using the GPS hardware component, determining whether the acquired speed is within predetermined vehicular speed ranges and identifying either a vehicular motion context or the non-vehicular motion context; if the vehicular motion context is not identified, powering off the GPS hardware component to save battery power; if the vehicular motion context is identified, detecting a start of a driving trip as a moment when first driving speed data is observed; and if the vehicular motion context is identified, detecting the end of driving trip as a moment when last driving speed data is observed.

In one or more embodiments, the method further comprises: acquiring, saving and digital signal processing a motion data to identify the vehicular motion context.

In one or more embodiments, the handheld communication device further comprises a Bluetooth component and the method further comprises: acquiring Bluetooth context data using the Bluetooth component; and identifying a specific vehicle by comparing the acquired Bluetooth context data to a unique Bluetooth identification of a vehicle related Bluetooth device.

In one or more embodiments, the handheld communication device further comprises a microphone component and the method further comprises: acquiring sound context data using the microphone component; and identifying a specific vehicle by comparing the acquired sound context data to unique sound patterns of at least one vehicle.

In accordance with another aspect of the embodiments described herein, there is provided a non-transitory computer readable medium embodying a set of computer executable instructions, which, when executed in connection with a handheld communication device comprising a GPS hardware component, a network-based position estimation component and a data processor, causes the handheld communication device to perform a method for monitoring a context in a battery efficient manner and for detecting a vehicular motion context, the method comprising: acquiring a sequence of location data readings using the network-based position estimation component; identifying a non-vehicular motion context based on changes in the acquired sequence of the location data readings; if the non-vehicular motion context is identified, continuing to acquire the sequence of the location data readings; if the non-vehicular motion context is not identified, powering on the GPS hardware component and acquiring speed data using the GPS hardware component, determining whether the acquired speed is within predetermined vehicular speed ranges and identifying either a vehicular motion context or the non-vehicular motion context; if the vehicular motion context is not identified, powering off the GPS hardware component to save battery power; if the vehicular motion context is identified, detecting a start of a driving trip as a moment when first driving speed data is observed; and if the vehicular motion context is identified, detecting the end of driving trip as a moment when last driving speed data is observed.

In one or more embodiments, the method further comprises: acquiring, saving and digital signal processing a motion data to identify the vehicular motion context.

In one or more embodiments, the handheld communication device further comprises a Bluetooth component and the method further comprises: acquiring Bluetooth context data using the Bluetooth component; and identifying a specific vehicle by comparing the acquired Bluetooth context data to a unique Bluetooth identification of a vehicle related Bluetooth device.

In one or more embodiments, the handheld communication device further comprises a microphone component and the method further comprises: acquiring sound context data using the microphone component; and identifying a specific vehicle by comparing the acquired sound context data to unique sound patterns of at least one vehicle.

In accordance with yet another aspect of the embodiments described herein, there is provided a method performed in connection with a handheld communication device for monitoring a context in a battery efficient manner and for detecting a vehicular motion context, the handheld communication device comprising a GPS hardware component, proximity component and data processor, the method comprising: acquiring proximity data using the proximity component; processing the acquired proximity data to identify a vehicular context; if the vehicular context is identified, powering on the GPS hardware component and acquiring speed data using the GPS hardware component, determining whether the acquired speed is within predetermined vehicular speed ranges and identifying either a vehicular motion context or the non-vehicular motion context; if the vehicular motion context is not identified, powering off the GPS hardware component to save battery power; if the vehicular motion context is identified, detecting a start of a driving trip as a moment when first driving speed data is observed; and if the vehicular motion context is identified, detecting the end of driving trip as a moment when last driving speed data is observed.

In one or more embodiments, the proximity component operates in accordance with a Bluetooth protocol.

In one or more embodiments, the proximity component operates in accordance with a RFID protocol.

In one or more embodiments, the proximity component operates in accordance with a NFC protocol.

In one or more embodiments, the handheld communication device comprises a Bluetooth component and the method further comprises: acquiring Bluetooth context data using the Bluetooth component; and identifying a specific vehicle by comparing the acquired Bluetooth context data to a unique Bluetooth identification of a vehicle related Bluetooth device.

In one or more embodiments, the handheld communication device comprises a microphone component and the method further comprises: acquiring sound context data using the microphone component; and identifying a specific vehicle by comparing the acquired sound context data to unique sound patterns of at least one vehicle.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Figure 1:
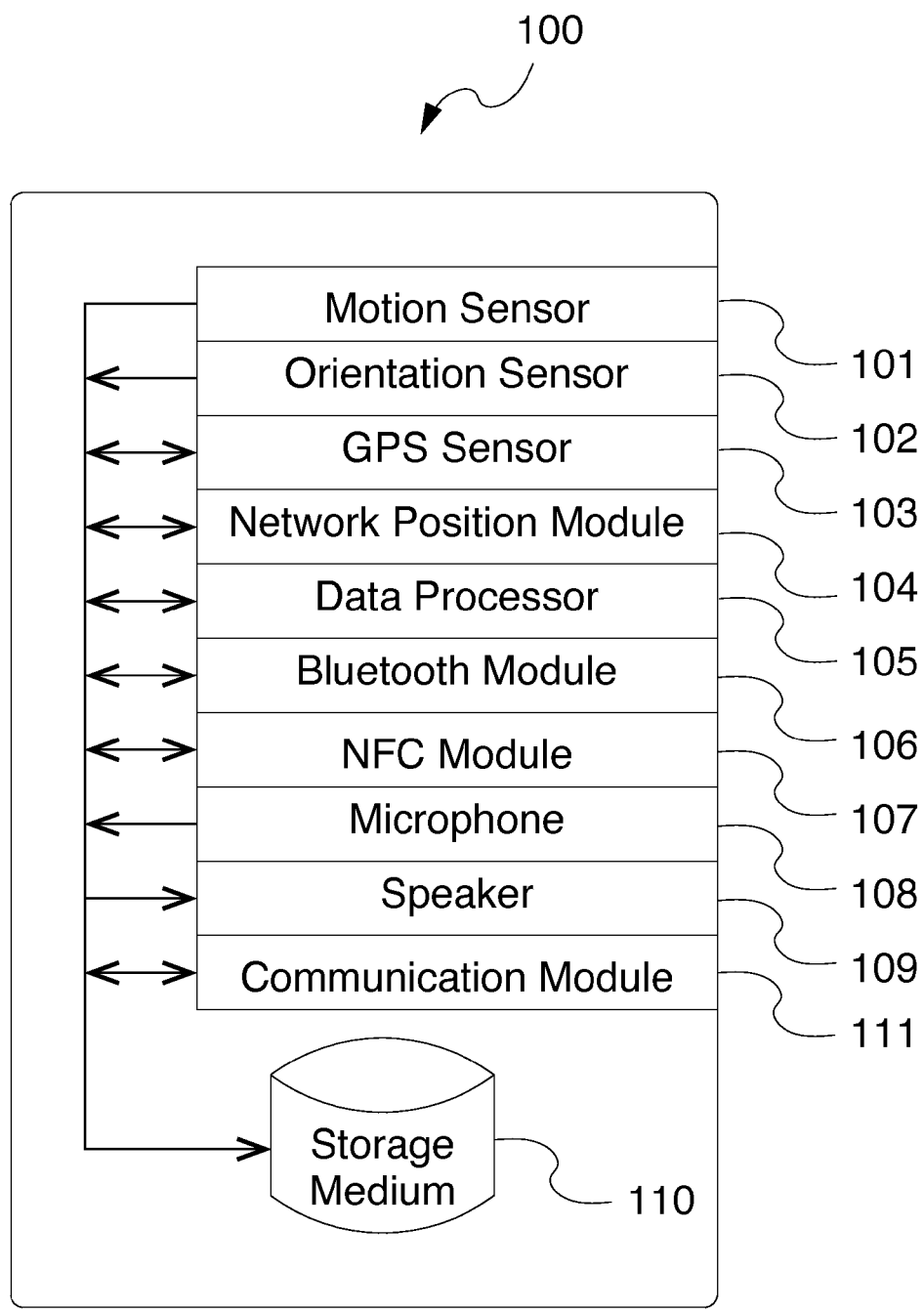
FIG. 1 illustrates an exemplary embodiment of a handheld communication device whereupon the various embodiments described herein may be implemented.

In accordance with one aspect of the embodiments described herein, there is provided a method of operating a general-purpose handheld communication device to monitor vehicular motion context and identify a specific vehicle associated with the detected vehicular motion. The handheld communication device 100 an exemplary embodiment of which is illustrated in FIG. 1 is located in a context of vehicular motion or non-vehicular motion. In various embodiments, the handheld communication device 100 may include one or more motion sensors 101, orientation sensors 102, GPS hardware component 103, network-based position estimation component 104, a data processor 105, Bluetooth component 106, NFC component 107, microphone 108, speaker 109, data storage medium 110, and data communication module 111.

In one or more embodiments, the aforesaid method performed in connection with the handheld communication device 100 involves acquiring location data using network-based position estimation component, obtaining motion data using the motion sensor; identifying a "non-vehicular motion context" and acquiring speed data using the GPS hardware component; analyzing speed for typical vehicular speed ranges and detecting the start and the end of "vehicular motion context" (driving trip) in a battery efficient manner.

Figure 2:
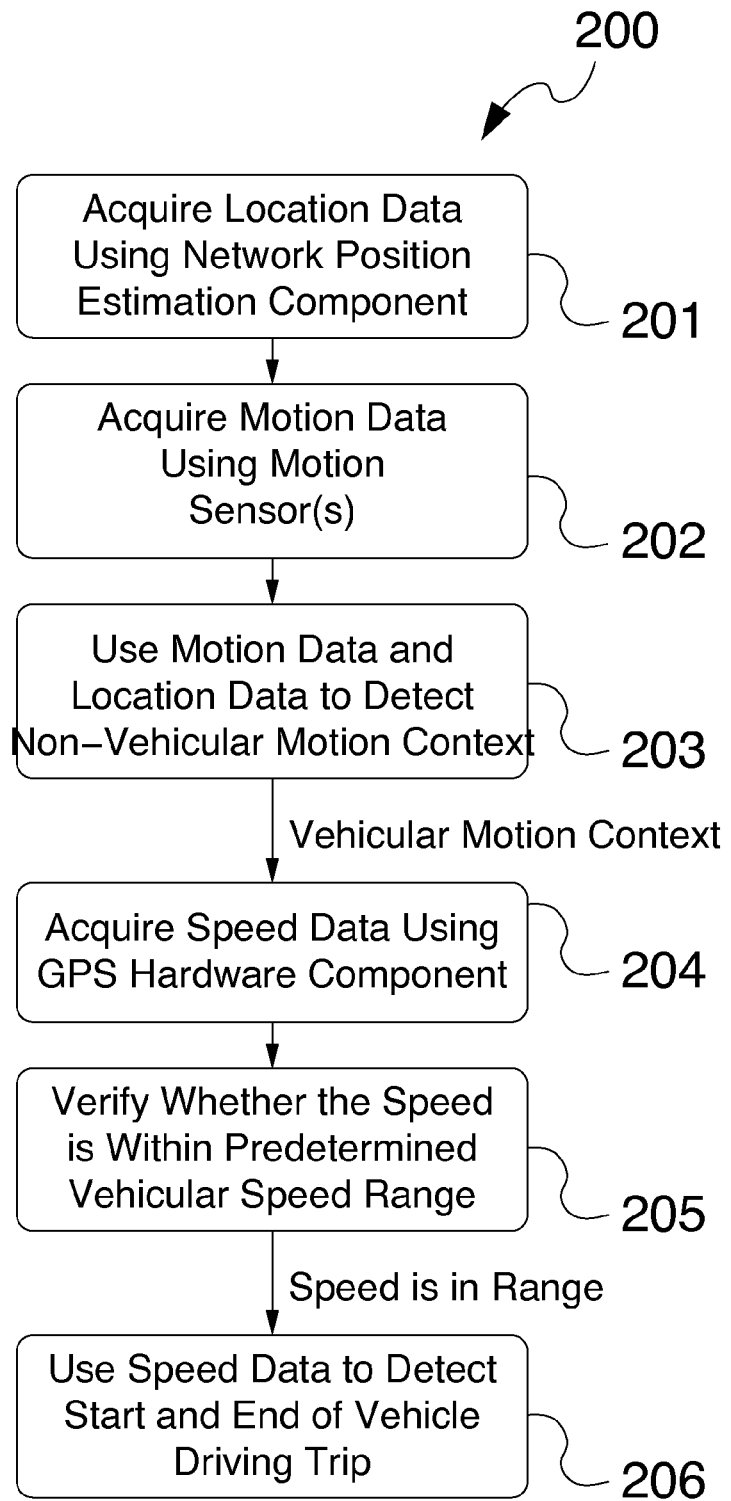
FIG. 2 illustrates an exemplary embodiment of a method for monitoring vehicular motion context and for identifying a specific vehicle associated with the detected vehicular motion performed in connection with the handheld communication device.

FIG. 2 illustrates an exemplary embodiment of a method 200 for monitoring vehicular motion context and for identifying a specific vehicle associated with the detected vehicular motion performed in connection with the handheld communication device 100. First, at step 201, the network-based position estimation component 104 of the handheld communication device 100 is used to acquire location data. At step 202, motion data is obtained using the one or more motion sensors 101. Subsequently, at step 203, the system determines, based on the location data and the motion data, if the handheld communication device 100 is in a "non-vehicular motion context." This determination is performed in accordance with predetermined criteria stored for example, on the storage medium of the handheld communication device 100. If it is determined at step 203 that the handheld communication device 100 is involved in a vehicular-type motion, then, at step 204, the speed data is acquired using the GPS hardware component 103. The acquired speed data is analyzed at step 205 to determine whether the detected speed is within a predetermined vehicular speed range. Finally, at step 206, the system detects the start and end of the vehicle trip using the analyzed speed data.

In one or more embodiments, the handheld communication device 100 operating in accordance with the embodiment of the method 200 described hereinabove utilizes battery efficient sensors and components (such as, for example, accelerometer, network-based position estimation component) to monitor the context of handheld device 24×7 and to detect a context, which is "not a vehicular motion" (for example, walking, standing, sitting, running, idling, etc.). As would be appreciated by persons of ordinary skill in the art, the "not a vehicular motion" context does not require the utilization of the highly power consuming GPS hardware component 103, which results in substantial savings of the battery power. In one or more embodiments, to extend the battery life, the high energy-consuming GPS hardware component 103 is utilized only when the "not a vehicular motion" context is not detected.

In one or more embodiments, the above-described method 200 may further involve receiving certain optional auxiliary data, including, without limitation, vehicle built-in or brought-in Bluetooth or NFC identification, which may be used to further assist in detecting the "vehicular context" and identifying a specific vehicle. Specifically, when a particular in Bluetooth or NFC identification string is detected by, for example, the Bluetooth component 106 of the NFC component 106, the handheld communication device 100 may be configured to determine that the handheld communication device 100 is located in a specific vehicle.

Furthermore, in accordance with yet another aspect of the embodiments described herein, the above-described method 200 may further include receiving an optional sound data via the microphone 108 of handheld communication device 100. In various embodiments, the handheld communication device 100 may be configured to analyze the received sound using sound analysis techniques well known to persons of ordinary skill in the art and to detect specific sounds including, without limitation, car engine sound, car turning signal sound, car doors sound and car belt sound. Upon detection of any such specific sounds, the handheld communication device 100 may be configured to use the detected sound information, such as frequency, spectral composition, and the like sound parameters, to identify a specific vehicle in the proximity of the handheld communication device 100.

In one or more embodiments, the above-described method 200 may further involve processing the sound data using various technics (including, but not limited to, time domain analysis and frequency domain analysis) to detect unique patterns of a specific vehicle. The techniques for performing such sound data processing are well known to persons of ordinary skill in the art.

In one or more embodiments, the above-described method 200 may further involve automatic learning of repeating unique sound patterns to identify a specific vehicle using various techniques well known to persons of ordinary skill in the art. Such well-known techniques include, without limitation, probabilistic machine learning technics.

Figure 3:
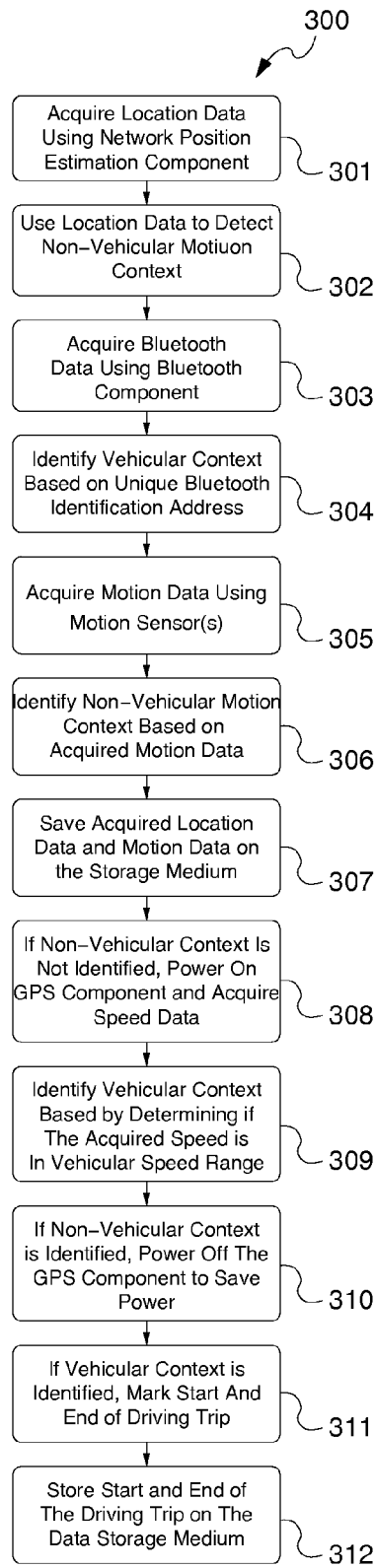
FIG. 3 illustrates another exemplary embodiment of a method performed by the handheld communication device.

FIG. 3 illustrates another exemplary embodiment of a method 300 performed by the handheld communication device 100. First, at step 301, the handheld communication device 100 may acquire location data using the network-based position estimation component 104. Based on the acquired location data, the handheld communication device 100 identifies, at step 302, a "non-vehicular motion context." Specifically, this is accomplished based on changes analysis in sequence of the acquired location data.

Optionally, at step 303, the handheld communication device 100 may acquire Bluetooth data using the Bluetooth component 106. In this case, at step 304, the handheld communication device 100 is configured to identify the "vehicular context" based on the unique Bluetooth identification address associated with a vehicle or some other Bluetooth device.

Optionally, at step 305, the handheld communication device 100 may acquire motion data using the motion sensors 101, and identify, at step 306, a "non-vehicular motion context" based on the acquired motion data. At step 307, the handheld communication device 100 saves the data that includes the acquired location data and the motion data on the data storage medium.

In one or more embodiments, if the "non-vehicular motion context" is not identified, the handheld communication device 100 is configured, at step 308, to power on the GPS hardware component and to acquire speed data using the GPS hardware component. At step 309, the handheld communication device 100 analyzes speed for typical vehicular speed ranges and identifies either "vehicular motion context" or "non-vehicular motion context."

In one or more embodiments, if "vehicular motion context" is not identified, the handheld communication device 100 is configured to power off the GPS hardware component 103 in order to save the battery power, see step 310.

In one or more embodiments, if "vehicular motion context" is identified, the start of the driving trip is set as a moment in time when the first driving speed data is observed, see step 311. In one or more embodiments, if "vehicular motion context" is identified, the ending of driving trip is set as a moment in time when the last driving speed data is observed, see step 311.

The beginning time of the driving trip and the ending time of the driving trip are then saved to the storage medium 110 of the handheld communication device 100 and used in further processing, see step 312.

Figure 4:
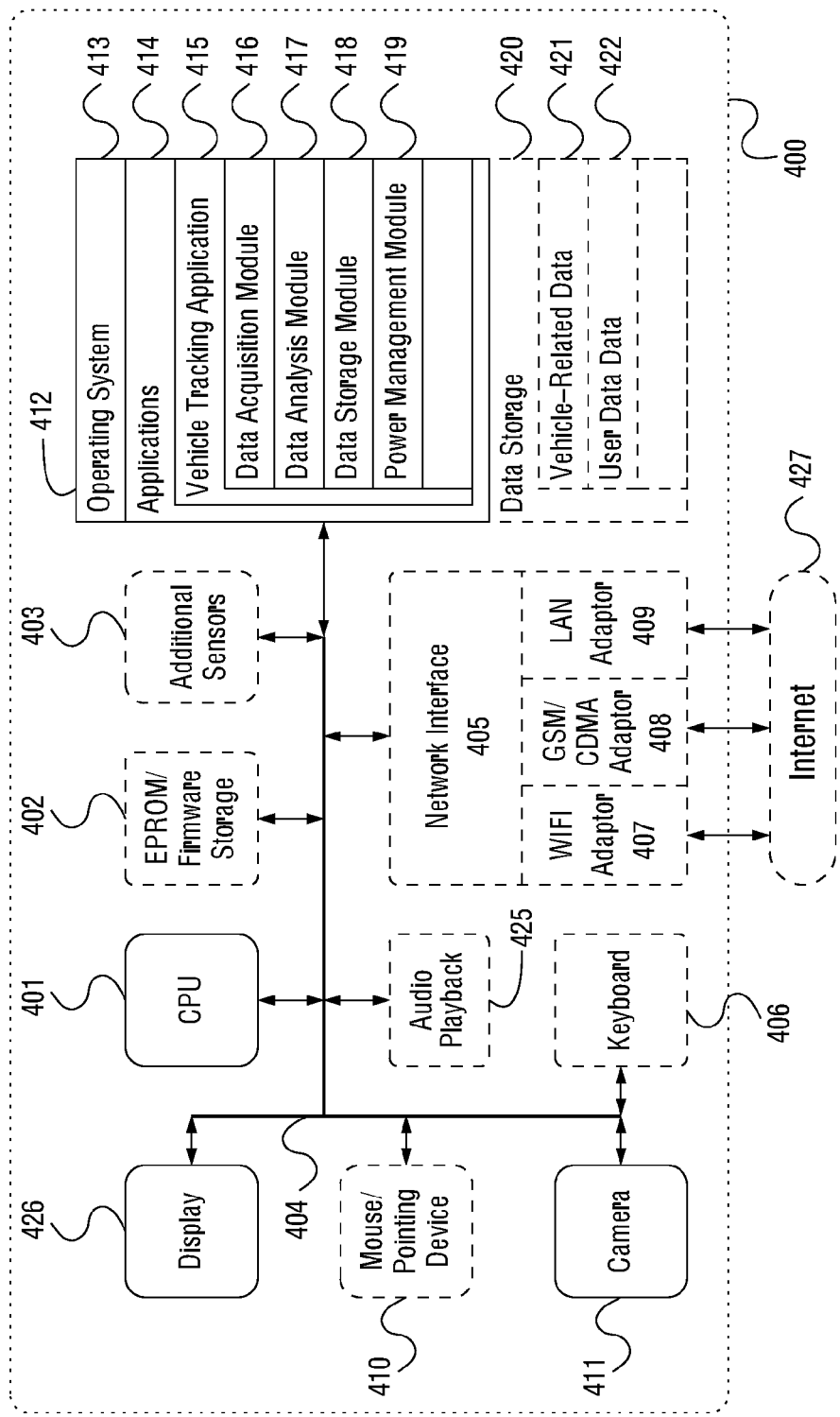
FIG. 4 illustrates another exemplary embodiment of a handheld communication device whereupon the various embodiments described herein may be implemented.

FIG. 4 illustrates an exemplary embodiment of mobile computerized system (handheld communication device) 400 for vehicle monitoring. In one or more embodiments, the computerized system 400 may be implemented within the form factor of a laptop or a notebook computer or a mobile computing device, such as a smartphone or a tablet computer.

The computerized system 400 may include a data bus 404 or other interconnect or communication mechanism for communicating information across and among various hardware components of the computerized system 400, and a central processing unit (CPU or simply processor) 401 electrically coupled with the data bus 404 for processing information and performing other computational and control tasks. Computerized system 400 also includes a memory 412, such as a random access memory (RAM) or other dynamic storage device, coupled to the data bus 404 for storing various information as well as instructions to be executed by the processor 401. The memory 412 may also include persistent storage devices, such as a magnetic disk, optical disk, solid-state flash memory device or other non-volatile solid-state storage devices.

In one or more embodiments, the memory 412 may also be used for storing temporary variables or other intermediate information during execution of instructions by the processor 401. Optionally, computerized system 400 may further include a read only memory (ROM or EPROM) 402 or other static storage device coupled to the data bus 404 for storing static information and instructions for the processor 401, such as firmware necessary for the operation of the computerized system 400, basic input-output system (BIOS), as well as various configuration parameters of the computerized system 400.

In one or more embodiments, the computerized system 400 may incorporate a display device 526, which may be also electrically coupled to the data bus 404, for displaying various information to a user of the computerized system 400, such as a user interface. In an alternative embodiment, the display device 426 may be associated with a graphics controller and/or graphics processor (not shown). The display device 426 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 426 may be incorporated into the same general enclosure with the remaining components of the computerized system 400. In an alternative embodiment, the display device 426 may be positioned outside of such enclosure, such as on the surface of a table or a desk. In one or more embodiments, the computerized system 400 may further incorporate a projector or mini-projector (not shown) configured to project information, such as the aforesaid user interface(s), onto a display surface.

In one or more embodiments, the computerized system 400 may further incorporate an audio playback device 425 electrically connected to the data bus 404 and configured to play various audio files, such as MPEG-3 files, or audio tracks of various video files, such as MPEG-4 files, well known to persons of ordinary skill in the art. To this end, the computerized system 400 may also incorporate waive or sound processor or a similar device (not shown).

In one or more embodiments, the computerized system 400 may incorporate one or more input devices, such as a mouse/pointing device 410, such as a mouse, a trackball, a touchpad, or cursor direction keys for communicating direction information and command selections to the processor 401 and for controlling cursor movement on the display 426. This input device typically has two degrees of freedom in two axes, a first axis (e.g., x) and a second axis (e.g., y), that allows the device to specify positions in a plane.

The computerized system 400 may further incorporate a camera 411 for acquiring still images and video of various objects, which all may be coupled to the data bus 404 for communicating information, including, without limitation, images and video, as well as user commands (including gestures) to the processor 401.

The computerized system 400 may further incorporate additional sensors 403, such as various location, motion or orientation sensors described above.

In one or more embodiments, the computerized system 400 may additionally include a communication interface, such as a network interface 405 coupled to the data bus 404. The network interface 405 may be configured to establish a connection between the computerized system 400 and the Internet 427 using at least one of a WIFI interface 407, a cellular network (GSM or CDMA) adaptor 408 and/or local area network (LAN) adaptor 409. The network interface 405 may be configured to enable a two-way data communication between the computerized system 400 and the Internet 427. The WIFI adaptor 407 may operate in compliance with 802.11a, 802.11b, 802.11g and/or 802.11n protocols as well as Bluetooth protocol well known to persons of ordinary skill in the art. The LAN adaptor 409 of the computerized system 400 may be implemented, for example, using an integrated services digital network (ISDN) card or a modem to provide a data communication connection to a corresponding type of telephone line, which is interfaced with the Internet 427 using Internet service provider's hardware (not shown). As another example, the LAN adaptor 409 may be a local area network interface card (LAN NIC) to provide a data communication connection to a compatible LAN and the Internet 427. In an exemplary implementation, the WIFI adaptor 407, the cellular network (GSM or CDMA) adaptor 408 and/or the LAN adaptor 409 send and receive electrical or electromagnetic signals that carry digital data streams representing various types of information.

In one or more embodiments, the Internet 427 typically provides data communication through one or more sub-networks to other network resources. Thus, the computerized system 400 is capable of accessing a variety of network resources located anywhere on the Internet 427, such as remote media servers, web servers, other content servers as well as other network data storage resources. In one or more embodiments, the computerized system 400 is configured to send and receive messages, media and other data, including video files and application program code, through a variety of network(s) including the Internet 427 by means of the network interface 405. In the Internet example, when the computerized system 400 acts as a network client, it may request code or data for an application program executing on the computerized system 400. Similarly, it may, as a server, send various data or computer code to other network resources.

In one or more embodiments, the functionality described herein is implemented by computerized system 400 in response to processor 401 executing one or more sequences of one or more instructions contained in the memory 412. Such instructions may be read into the memory 412 from another computer-readable medium. Execution of the sequences of instructions contained in the memory 412 causes the processor 401 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 401 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 401 for execution. For example, the instructions may initially be carried on a magnetic disk from a remote computer. Alternatively, a remote computer can load the instructions into its dynamic memory and send the instructions over the Internet 427. Specifically, the computer instructions may be downloaded into the memory 412 of the computerized system 400 from the foresaid remote computer via the Internet 427 using a variety of network data communication protocols well known in the art.

In one or more embodiments, the memory 412 of the computerized system 400 may store any of the following software programs, applications or modules:

1. Operating system (OS) 413 for implementing basic system services and managing various hardware components of the computerized system 400. Exemplary embodiments of the operating system 413 are well known to persons of skill in the art, and may include any now known or later developed operating systems.

2. Applications 414 may include, for example, a set of software applications executed by the processor 401 of the computerized system 400, which cause the computerized system 400 to perform certain predetermined functions. In one or more embodiments, the applications 414 may include an inventive vehicle monitoring application 415.

3. Data storage 420 may include, for example, a vehicle-related data storage 421 for storing various data related to vehicle motion and operation as well as user data storage 422.

In one or more embodiments, the inventive vehicle monitoring application 415 incorporates a data acquisition module 416 for acquiring various data using sensors of the computing device 400, a data analysis module 417 for analyzing the acquired data, a data storage module 418 for storing vehicle-related data in the storage medium as well as power management module 419 for effectively managing the power of the computing device 400.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for vehicle monitoring. It is intended that the specification and examples be considered as exemplary only, with a true scope and spirit of the invention being indicated by the following claims.

What is claimed is:

1. A method performed in connection with a handheld communication device for monitoring a context in a battery efficient manner and for detecting a vehicular context, the handheld communication device comprising a GPS hardware component, a network-based position estimation component and a data processor, the method comprising:

acquiring a sequence of location data readings using the network-based position estimation component;

identifying a non-vehicular context based on changes in the acquired sequence of the location data readings;

when the non-vehicular context is identified, continuing to acquire the sequence of the location data readings;

when the non-vehicular context is not identified, powering on the GPS hardware component and acquiring speed data using the GPS hardware component, determining whether the acquired speed is within predetermined vehicular speed ranges and identifying either a vehicular context or the non-vehicular context;

when the vehicular context is not identified, powering off the GPS hardware component to save battery power;

when the vehicular context is identified, detecting a start of a driving trip as a moment when first driving speed data is observed; and when the vehicular context is identified, detecting the end of driving trip as a moment when last driving speed data is observed.

2. The method of claim 1, further comprising: acquiring, saving and digital signal processing a location data to identify the vehicular context.

3. The method of claim 1, wherein the handheld communication device further comprises a Bluetooth component, the method further comprising:

acquiring Bluetooth context data using the Bluetooth component; and identifying a specific vehicle by comparing the acquired Bluetooth context data to a unique Bluetooth identification of a vehicle related Bluetooth device.

4. The method of claim 1, wherein the handheld communication device further comprises a microphone component, the method further comprising:

acquiring sound context data using the microphone component; and identifying a specific vehicle by comparing the acquired sound context data to unique sound patterns of at least one vehicle.

5. A non-transitory computer readable medium embodying a set of computer executable instructions, which, when executed in connection with a handheld communication device comprising a GPS hardware component, a network-based position estimation component and a data processor, causes the handheld communication device to perform a method for monitoring a context in a battery efficient manner and for detecting a vehicular context, the method comprising:
　　acquiring a sequence of location data readings using the network-based position estimation component;
　　identifying a non-vehicular context based on changes in the acquired sequence of the location data readings;
　　when the non-vehicular context is identified, continuing to acquire the sequence of the location data readings;
　　when the non-vehicular context is not identified, powering on the GPS hardware component and acquiring speed data using the GPS hardware component, determining whether the acquired speed is within predetermined vehicular speed ranges and identifying either a vehicular context or the non-vehicular context;
　　when the vehicular context is not identified, powering off the GPS hardware component to save battery power;
　　when the vehicular context is identified, detecting a start of a driving trip as a moment when first driving speed data is observed; and
　　when the vehicular context is identified, detecting the end of driving trip as a moment when last driving speed data is observed.

6. The non-transitory computer readable medium of claim 5, wherein the method further comprises: acquiring, saving and digital signal processing a location data to identify the vehicular context.

7. The non-transitory computer readable medium of claim 5, wherein the handheld communication device further comprises a Bluetooth component, and wherein the method further comprises:
　　acquiring Bluetooth context data using the Bluetooth component; and
　　identifying a specific vehicle by comparing the acquired Bluetooth context data to a unique Bluetooth identification of a vehicle related Bluetooth device.

8. The non-transitory computer readable medium of claim 5, wherein the handheld communication device further comprises a microphone component, and wherein the method further comprises:
　　acquiring sound context data using the microphone component; and
　　identifying a specific vehicle by comparing the acquired sound context data to unique sound patterns of at least one vehicle.

9. A method performed in connection with a handheld communication device for monitoring a context in a battery efficient manner and for detecting a vehicular context, the handheld communication device comprising a GPS hardware component, a proximity component and a data processor, the method comprising:
　　acquiring proximity data using the proximity component;
　　processing the acquired proximity data to identify a vehicular context;
　　when the vehicular context is identified, powering on the GPS hardware component and acquiring speed data using the GPS hardware component, determining whether the acquired speed is within predetermined vehicular speed ranges and identifying either a vehicular context or the non-vehicular context;
　　when the vehicular context is not identified, powering off the GPS hardware component to save battery power;
　　when the vehicular context is identified, detecting a start of a driving trip as a moment when first driving speed data is observed; and
　　when the vehicular context is identified, detecting the end of driving trip as a moment when last driving speed data is observed.

10. The method of claim 9, wherein the proximity component operates in accordance with a Bluetooth protocol.

11. The method of claim 9, wherein the proximity component operates in accordance with a RFID protocol.

12. The method of claim 9, wherein the proximity component operates in accordance with a NFC protocol.

13. The method of claim 9, wherein the handheld communication device comprises a Bluetooth component, the method further comprising:
　　acquiring Bluetooth context data using the Bluetooth component; and
　　identifying a specific vehicle by comparing the acquired Bluetooth context data to a unique Bluetooth identification of a vehicle related Bluetooth device.

14. The method of claim 9, wherein the handheld communication device comprises a microphone component, the method further comprising:
　　acquiring sound context data using the microphone component; and
　　identifying a specific vehicle by comparing the acquired sound context data to unique sound patterns of at least one vehicle.

* * * * *